Aug. 27, 1935.  H. C. JOHANSEN  2,012,280
CHUCK MECHANISM
Original Filed May 25, 1932
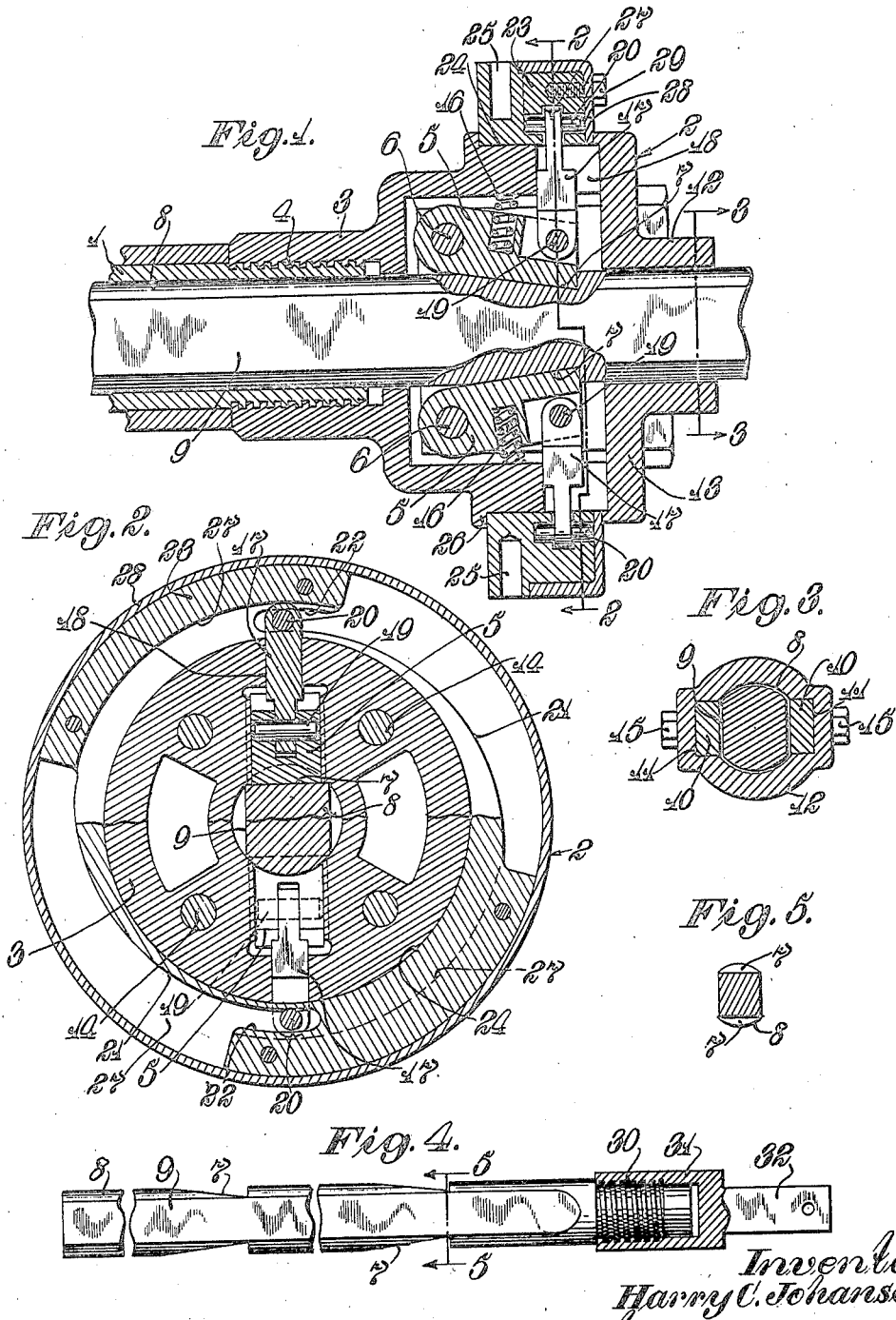
Inventor:
Harry C. Johansen.
by
Louis A. Maxon.
Atty.

Patented Aug. 27, 1935

2,012,280

UNITED STATES PATENT OFFICE 2,012,280

CHUCK MECHANISM

Harry C. Johansen, Michigan City, Ind., assignor to Sullivan Machinery Company, a corporation of Massachusetts Original application May 25, 1932, Serial No. 613,495. Divided and this application September 20, 1932, Serial No. 634,011

27 Claims. (Cl. 255—22)

This invention relates to chuck mechanisms, and more particularly to improvements in a chuck mechanism especially adapted to use with a feed stem or "Kelley" of a rotary drilling apparatus. An object of this invention is to provide an improved chuck mechanism. Another object is to provide an improved chuck mechanism especially adapted to use with a feed stem or "Kelley" of a rotary drilling apparatus. A further object is to provide an improved chuck mechanism having improved means for operating the chuck elements thereof. A still further object is to provide an improved chuck mechanism especially adapted to use with a feed stem of a rotary drilling apparatus and having embodied therein improved means for connecting the feed stem to the drill spindle, and improved feed stem driving means. These and other objects and advantages of the invention will, however, hereinafter more fully appear.

In the accompanying drawing there is shown, for purposes of illustration, one form which the invention may assume in practice.

In this drawing,—

Fig. 1 is a central, longitudinally extending sectional view through the illustrative embodiment of the improved chuck mechanism.

Fig. 2 is a transverse sectional view taken substantially on line 2—2 of Fig. 1.

Fig. 3 is a transverse sectional view taken substantially on line 3—3 of Fig. 1.

Fig. 4 is an elevational view of the improved feed stem with which the chuck mechanism is associated.

Fig. 5 is a detail sectional view taken on line 5—5 of Fig. 4.

In this illustrative embodiment of the invention, which is a division of my co-pending application Serial No. 613,495, filed May 25, 1932, there is shown a drill spindle 1 which has suitable means for rotating and axially moving the same and which may assume a form similar to that disclosed in the co-pending application mentioned above.

Secured to the drill end of the drill spindle is the improved chuck mechanism, generally designated 2, and this chuck mechanism comprises a casing 3 threadedly connected at 4 to the drill spindle. Arranged within the chuck casing is a pair of chuck jaws 5 pivotally mounted on transverse pins 6 supported within the chuck casing. These chuck jaws are engageable with notches 7 formed in the cylindrical walls of a feed stem or "Kelley" 8; herein arranged centrally within the drill spindle, as shown. As most clearly shown in Figs. 4 and 5, the sides of the feed stem opposite from the notches 7 are flattened at 9 for engagement with drive blocks 10, shown in Fig. 3, and seated within recesses 11 formed within the hub 12 of a closure plate 13 secured, as by bolts 14, to the chuck casing. These drive blocks are held in position within the recesses 11 by means of screws 15. The chuck jaws 5 are normally urged into their notch engaging position, as shown in Fig. 1, by means of coiled springs 16; and the means for actuating these jaws comprises reciprocable actuating elements 17 slidably mounted within guides 18 formed in the chuck casing and pivotally connected by pins 19 to the chuck jaws. Carried by the outer ends of these members 17 are transverse pins 20 engageable with inner and outer cam surfaces 21 and 22 formed on an operating member or ring 23 rotatably mounted at 24 on the exterior of the chuck casing. This operating ring is provided with radial openings 25 for the insertion of a turning bar, and is held in position on the chuck casing between a flange 26 integral with the casing and the cap member 13, in the manner shown in Fig. 1. The member 23 is slotted at 27 to receive the outer ends of the members 17 and to permit rotation of the operating ring 23 relative thereto. These slots 27 are closed at their outer sides by a cylindrical cover member 28 surrounding the operating ring 23 and attached to the operating ring by screws 29. When the operating ring 23 is in the position shown in Fig. 1, the pins 20 engage the outer cam surfaces 22, the latter thereby holding the members 17 inwardly, with the chuck jaws in their notch engaging position, that is, with the chuck jaws seated within the notches 7 on the feed stem 8. When the operating ring 23 is rotated in a counterclockwise direction, as viewed in Fig. 2, the pins 20 are initially released from the outer cam surfaces 22 and the chuck jaws are at that time held in engagement with the stem by the coiled springs 16 and are free to swing outwardly against the tension of the springs. Upon further rotation of the operating ring in a clockwise direction, the chuck jaws are positively swung outwardly into their released position by the inner cam surfaces 21.

It will thus be seen that when the operating ring 23 is in its intermediate position the drill spindle 1 may be fed rearwardly relative to the feed stem, the chuck jaws at that time automatically springing out from the notches 7 in the stem and riding along the cylindrical sides of the stem until the jaws spring into engagement with a second set of notches, the notches being spaced longitudinally of the stem at a distance apart equal to the travel of the feeding elements for the drill spindle, as described in the above mentioned copending application. It will also be evident that the chuck jaws may be positively held in engagement with the notches in the feed stem by rotating the operating ring to the position shown in Fig. 2, wherein the outer cam surfaces 22 positively hold the chuck jaws against release.

Threadedly connected at 30 to the outer end of the feed stem 8 is a coupling 31 having a squared portion 32 adapted to fit within a suitable socket formed within any suitable type of drilling implement.

As the particular construction of the means for rotating and axially moving the drill spindle 1, and the particular type of drilling implement employed, do not enter into this invention, and as the improved chuck mechanism may be associated with various types of drilling apparatus utilizing various types of drilling implements, further description thereof is considered unnecessary.

In the use of the improved chuck mechanism, as the feed stem moves outwardly upon axial movement of the drill spindle, the stem is rotated by the drill spindle through the drive blocks 10 of the chuck. It will be understood that the chuck jaws are in their engaged position shown in Fig. 1, at that time. Upon reversal of the feeding movement of the drill spindle, the chuck jaws 5 are released automatically from the notches 7 in the feed stem, and as the chuck moves rearwardly relative to the feed stem, the chuck jaws ride over the cylindrical surface of the feed stem until they are engaged automatically by the coiled springs with another set of notches. The chuck operating ring 23 is then moved into its jaw locking position, thereby positively to hold the chuck jaws against release. The drill spindle is then again fed forwardly to effect forward feed of the drill stem. The chuck jaws may be released from the feed stem at will and held in their released position simply by rotating the operating ring 23 into a position wherein the cam surfaces 21 thereon hold the elements 17 in their outermost position within their guides.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In a drilling apparatus, a cylindrical feed stem having flattened side walls, and notches cut in the cylindrical sides of said stem.

2. In a drilling apparatus, a feed stem having notches on the periphery thereof and means adapted for engagement with rotation means, and a cooperating rotatable chuck device having rotation means engageable with said means and pivoted chuck jaws engageable with said notches.

3. A feed stem chuck mechanism comprising a rotatable casing having a central opening through which a feed stem is adapted to extend, means carried by said casing and engageable with the feed stem for rotating the latter, chuck jaws pivotally mounted in said casing at the sides of said opening and engageable with a feed stem extending through said opening, and means for swinging said jaws into their connected or released position including an operating element rotatably mounted on the chuck casing and operatively connected to said jaws.

4. A feed stem chuck mechanism comprising a casing having a central opening through which a feed stem is adapted to extend, chuck jaws pivotally mounted in said casing at the sides of said opening and engageable with a feed stem extending through said opening, springs for normally urging said jaws into their feed stem engaging position, and means connected to said jaws and operable at will for simultaneously releasing said jaws.

5. A feed stem chuck mechanism comprising a casing having a central opening through which a feed stem is adapted to extend, chuck jaws pivotally mounted in said casing at the sides of said opening and engageable with a feed stem, extending through said opening, springs for normally urging said jaws into their feed stem engaging position, and means operable at will for releasing said jaws, and for positively holding said jaws in their connected position.

6. In a feed stem chuck mechanism, a casing, means carried by said casing for engaging and driving a feed stem, chuck jaws pivotally mounted in said casing and having means distinct from aforesaid means for gripping the feed stem, and means for swinging said jaws into engagement with the feed stem and for positively holding said jaws in their released position.

7. In a feed stem chuck mechanism, a casing having a central opening through which a feed stem is adapted to extend, chuck jaws pivotally mounted in said casing and swingable into engagement with said stem, and means rotatably mounted on said casing and operatively connected to said jaws for holding said jaws in engagement with the feed stem.

8. In a feed stem chuck mechanism, a casing having a central opening through which a feed stem is adapted to extend, chuck jaws pivotally mounted in said casing and swingable into engagement with said stem, and means rotatably mounted on said casing and operatively connected to said jaws for holding said jaws in engagement with the feed stem, said jaws, when said holding means is released, being automatically releasable upon movement of the chuck casing relative to the feed stem.

9. In a feed stem chuck mechanism, a rotatable casing having a central opening through which a feed stem is adapted to extend, means carried by said casing and engaging said feed stem for rotating the latter, chuck jaws mounted in said casing, and springs for yieldably urging said jaws into engagement with the stem, said jaws being automatically releasable from said stem upon movement of the chuck mechanism relative to said stem.

10. In a feed stem chuck mechanism, a casing having a central opening through which a feed stem is adapted to extend, chuck jaws mounted in said casing, springs for yieldably urging said jaws into engagement with the stem, said jaws being automatically releasable from said stem upon movement of the chuck mechanism relative to said stem, and means connected to the jaws and operable at will on motion in one direction positively to hold said jaws in engagement with the stem and upon reverse movement to retract said jaws against the action of said springs.

11. In a feed stem chuck mechanism, a casing having a central opening through which a feed stem is adapted to extend, chuck jaws mounted in said casing, springs for yieldably urging said jaws into engagement with the stem, said jaws being automatically releasable from said stem upon movement of the chuck mechanism relative to said stem, and means connected to the jaws and operable at will for positively holding said jaws in engagement with the stem, said means being operable to move and hold said jaws in their released position.

12. In a drilling apparatus, a feed stem having notches on its periphery and spaced longitudinally of its length and means adapted for engagement with rotation means, and a cooperating stem rotating and feeding chuck device having rotation means engaging said means and pivoted chuck jaws engageable with said notches, said jaws being automatically releasable from said stem notches upon relative longitudinal movement between said stem and chuck device.

13. In a drilling apparatus, a feed stem having notches on its periphery and spaced longitudinally of its length and means adapted for engagement with rotation means, and a cooperating stem rotating and feeding chuck device having rotation means engaging said means and pivoted chuck jaws engageable with said notches, said jaws being automatically releasable from said stem notches upon relative longitudinal movement between said stem and chuck device and automatically engageable with other notches upon relative movement of the chuck device and stem a distance equal to the distance which the notches are longitudinally spaced on the stem.

14. In a feed stem chuck mechanism, a casing, chuck jaws pivotally mounted in said casing, and means for swinging said jaws into engagement with the stem or for positively holding said jaws in released position including plungers guided in said casing and pivotally connected to said jaws, and means for moving said plungers.

15. In a feed stem chuck mechanism, a casing, chuck jaws pivotally mounted in said casing, and means for swinging said jaws into engagement with the stem or for positively holding said jaws in released position including plungers guided in said casing and pivotally connected to said jaws, and means for moving said plungers including an operating member surrounding and journaled on said casing.

16. In a feed stem chuck mechanism, a casing, chuck jaws pivotally mounted in said casing, and means for swinging said jaws into engagement with the stem or for positively holding said jaws in released position including plungers guided in said casing and pivotally connected to said jaws, and means for moving said plungers including a rotatable cam device.

17. In a feed stem chuck mechanism, a casing, chuck jaws pivotally mounted in said casing, and means for swinging said jaws into engagement with the stem or for positively holding said jaws in released position including plungers guided in said casing and pivotally connected to said jaws, means for moving said plungers including a rotatable cam device, and means for rotating said device including an operating member surrounding and journaled on said casing.

18. In a feed stem chuck mechanism, a rotatable casing, means carried by said casing and engaging a feed stem for rotating the latter, chuck jaws pivotally mounted in said casing, yieldable means for normally urging said jaws into engagement with a feed stem, and means for moving said jaws out of engagement with said stem against the action of said yieldable means, said jaws being automatically releasable from said stem upon relative longitudinal movement between the stem and chuck mechanism.

19. In a drilling apparatus, a cylindrical feed stem having flattened side walls and notches cut in the cylindrical sides of said stem, each notch having a transverse surface and a rearwardly inclined surface.

20. In a feed stem chuck mechanism, a rotatable casing having a central opening through which a feed stem is adapted to extend, means carried by said casing for engaging the stem to connect the stem for rotation with said casing, chuck jaws pivotally mounted in said casing at the sides of said opening and swingable into engagement with the stem, and means for swinging and holding said jaws in feed stem engaging position.

21. In a feed stem chuck mechanism, a rotatable casing having a central opening through which a feed stem is adapted to extend, means carried by said casing for engaging the stem to connect the stem for rotation with said casing, chuck jaws guided in said casing at the sides of said opening and movable into engagement with said stem, and springs for urging said jaws into feed stem engaging position.

22. In a feed stem chuck mechanism, a rotatable casing having a central opening through which a feed stem is adapted to extend, means carried by said casing for engaging the stem to connect the stem for rotation with said casing, chuck jaws guided in said casing at the sides of said opening and movable into engagement with said stem, springs for urging said jaws into feed stem engaging position, and means for positively holding said jaws in said feed stem engaging position.

23. In a feed stem chuck mechanism, a rotatable casing having a central opening through which a feed stem is adapted to extend, means carried by said casing for engaging the stem to connect the stem for rotation with said casing, chuck jaws guided in said casing at the sides of said opening and movable into engagement with said stem, springs for urging said jaws into feed stem engaging position, and means connected to said jaws for releasing said jaws from engagement with said stem against the action of said springs.

24. In a feed stem chuck mechanism, a rotatable casing having a central opening through which a feed stem is adapted to extend, means carried by said casing for engaging the stem to connect the stem for rotation with said casing, chuck jaws pivotally mounted in said casing at the sides of said opening and swingable into engagement with said stem, means for swinging said jaws into feed stem engaging position, and means for releasing said jaws comprising a manually rotatable member having cam surfaces engaging with means connected to said jaws.

25. In a feed stem chuck mechanism, a rotatable casing having a central opening through which a feed stem is adapted to extend, means carried by said casing for engaging the stem to connect the stem for rotation with said casing, chuck jaws pivotally mounted in said casing at the sides of said opening and swingable into engagement with said stem, means for swinging said jaws into feed stem engaging position, and means for releasing said jaws comprising a manually rotatable member having cam surfaces engaging with means connected to said jaws, said rotatable member having means engageable with said last mentioned means for positively locking said jaws in their stem engaging position.

26. In a feed stem chuck mechanism, a rotatable casing having a central opening through which a feed stem is adapted to extend, a plate secured to said casing and carrying blocks engageable with flattened sides of the feed stem for rotating the stem, chuck jaws pivotally mounted in said casing at the sides of said opening and swingable into engagement with the stem, and means for swinging and holding said jaws in feed stem engaging position.

27. In a feed stem chuck mechanism, a cylindrical casing having an opening through which a feed stem is adapted to extend, chuck jaws mounted in said casing at the sides of said opening for connecting the stem to said casing, springs for urging said jaws toward their stem engaging position, and a member mounted on and surrounding said casing and having cam surfaces and arcuate slots, means engageable with said cam surfaces for swinging said jaws about their pivots, said means engageable with said slots for locking said jaws in their stem engaging position, said member being adjustable to release said jaws against the action of said springs.

HARRY C. JOHANSEN.